United States Patent
Finn et al.

(10) Patent No.: US 9,418,299 B2
(45) Date of Patent: Aug. 16, 2016

(54) SURVEILLANCE PROCESS AND APPARATUS

(71) Applicant: BAE SYSTEMS plc, London (GB)

(72) Inventors: Harry John Finn, Preston Lancashire (GB); Peter Noble Hudson, Preston Lancashire (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/407,741

(22) PCT Filed: Jun. 26, 2013

(86) PCT No.: PCT/GB2013/051691
§ 371 (c)(1),
(2) Date: Dec. 12, 2014

(87) PCT Pub. No.: WO2014/001800
PCT Pub. Date: Jan. 3, 2014

(65) Prior Publication Data
US 2015/0169964 A1 Jun. 18, 2015

(30) Foreign Application Priority Data
Jun. 28, 2012 (GB) .................................. 1211465.8

(51) Int. Cl.
*G06K 9/00* (2006.01)
*G08B 13/196* (2006.01)
(Continued)

(52) U.S. Cl.
CPC .......... *G06K 9/00771* (2013.01); *G06K 9/4604* (2013.01); *G08B 13/19652* (2013.01); *G08B 13/19667* (2013.01); *H04N 5/341* (2013.01); *H04N 5/3535* (2013.01)

(58) Field of Classification Search
CPC ............. G06K 9/00; G08B 13/00; H04N 5/00
USPC ........ 382/103, 236, 312; 348/47–50, 73, 143, 348/151, 159, 169, 174, 207.99, 211.13, 348/352
See application file for complete search history.

(56) References Cited

U.S. PATENT DOCUMENTS 7,613,321 B2 * 11/2009 Altherr ................. G06T 7/2033
382/103
2005/0196017 A1 9/2005 Altherr et al.
(Continued)

FOREIGN PATENT DOCUMENTS

JP 2006099404 A 4/2006
WO 2008057285 A2 5/2008
(Continued)

OTHER PUBLICATIONS

International Preliminary Report on Patentability and Written Opinion received for Patent Application No. PCT/GB2013/051691, mailed on Jan. 8, 2015. 9 pages.
(Continued)

*Primary Examiner* — Abolfazl Tabatabai
(74) *Attorney, Agent, or Firm* — Finch & Maloney PLLC

(57) ABSTRACT

A method and apparatus for performing surveillance comprising: imaging, at a first frame rate, an area (4) to produce images; detecting, using the images, a feature of interest (22) within the area (4); determining a region of interest (24), the region of interest (24) corresponding to a region within the area (4) in which the feature of interest (22) will be located at a later time-step; and, at the later time-step, using the region of interest (24), imaging the area (4) such that images of the region within the area (4) in which the feature of interest (22) is located are produced at a second frame rate, while images of the rest of the area (4) are produced at a third frame rate, the second rate being different to the third rate.

20 Claims, 3 Drawing Sheets

(51) Int. Cl.
*H04N 5/341* (2011.01)
*G06K 9/46* (2006.01)
*H04N 5/225* (2006.01)
*H04N 5/353* (2011.01)

(56) References Cited

U.S. PATENT DOCUMENTS

2006/0077255 A1* 4/2006 Cheng .................. G06K 9/0063
 348/143
2008/0285797 A1* 11/2008 Hammadou ....... G06K 9/00771
 382/103
2010/0157056 A1 6/2010 Zohar et al.
2012/0113119 A1 5/2012 Massie

FOREIGN PATENT DOCUMENTS

WO 2008136007 A2 11/2008
WO 2014001800 A1 1/2014

OTHER PUBLICATIONS

International Search Report and Written Opinion received for Patent Application No. PCT/GB2013/051691, mailed on Sep. 11, 2013. 11 pages.
GB Intellectual Property Office Search Report under Section 17(5) received for GB Patent Application No. 1211465.8 mailed Nov. 22, 2012. 3 pages.

* cited by examiner

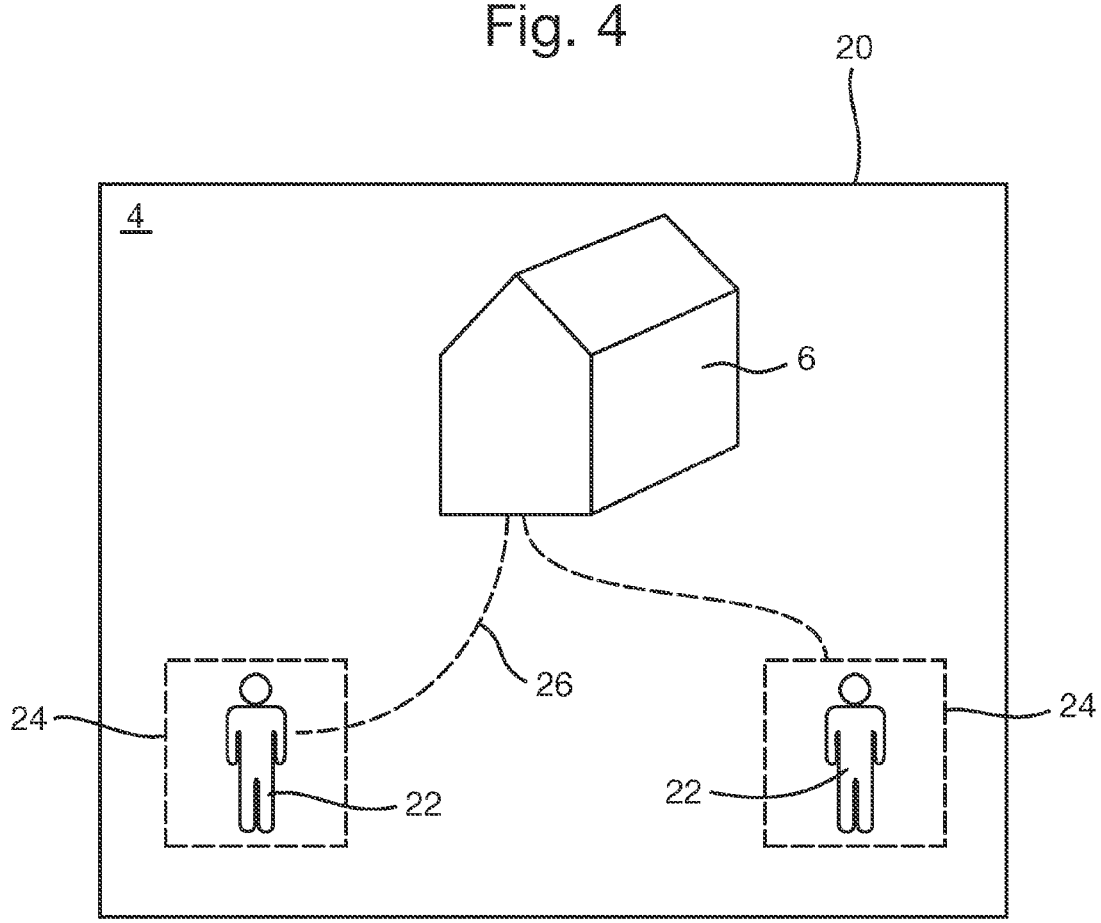

SURVEILLANCE PROCESS AND APPARATUS

FIELD OF THE INVENTION

The present invention relates to methods and apparatus for performing surveillance.

BACKGROUND

Aircraft, e.g. Unmanned Air Vehicles (UAVs), are commonly used in surveillance operations.

For surveillance operations in which images of an area under surveillance are captured by a UAV and are transmitted from the UAV for use by a remote entity, or stored on the UAV, communication and memory/storage bandwidth requirements tend to be relatively high. This is particularly the case when those images are captured at a high frame rate (i.e. frequency) or with high resolution.

These relatively high bandwidth requirements may limit operation of the UAV.

SUMMARY OF THE INVENTION

In a first aspect, the present invention provides a surveillance process comprising imaging an area under surveillance to produce a plurality of images of the area under surveillance, the images being produced at a first frame rate, detecting, using one or more of the images, a feature of interest within the area under surveillance, determining a region of interest, the region of interest being either a region within the area under surveillance in which the feature of interest will be located at a later time-step, or a region within an image of the area under surveillance corresponding to a region within the area under surveillance in which the feature of interest will be located at a later time-step, and, at the later time-step, using the determined region of interest, imaging the area under surveillance such that images of the region within the area under surveillance in which the feature of interest is located are produced at a second frame rate, whilst images of the area under surveillance not within the region of the area under surveillance in which the feature of interest is located are produced at a third frame rate, the second rate being different to the third rate.

The second rate may be a higher rate than the third rate.

The first rate may be substantially equal to the third rate.

The surveillance process may further comprise performing a tracking process to track the detected feature of interest or to track the determined region of interest over a period of time.

The tracking process may be performed automatically by one or more processors.

The step of detecting may be performed automatically by one or more processors.

The step of detecting may be performed manually by an operator (e.g. a human operator).

The step of detecting the feature of interest may comprise performing a change detection algorithm to detect a change between one of the generated images and a subsequently generated image.

At the later time-step, the images of the region within the area under surveillance in which the feature of interest is located may have a first resolution, whilst the images of the area under surveillance not within the region of the area under surveillance in which the feature of interest is located may have a second resolution.

The first resolution may be higher than the second resolution.

The imaging may be performed using sensor array comprising a plurality of sensors. A rate at which each sensor in the sensor array captures images may be changed independently from that of each of the other sensors.

The sensor array may be a Complementary Metal Oxide Semiconductor sensor.

In a further aspect, the present invention provides surveillance apparatus comprising one or more sensors configured to image an area under surveillance to produce a plurality of images of the area under surveillance, the images being produced at a first frame rate, and one or more processors operatively coupled to the one or more sensors and configured to detect, using one or more of the images, a feature of interest within the area under surveillance, and determine a region of interest, the region of interest being either a region within the area under surveillance in which the feature of interest will be located at a later time-step, or a region within an image of the area under surveillance corresponding to a region within the area under surveillance in which the feature of interest will be located at a later time-step, wherein the one or more sensors are further configured to, at the later time-step, imaging the area under surveillance such that images of the region within the area under surveillance in which the feature of interest is located are produced at a second frame rate, whilst images of the area under surveillance not within the region of the area under surveillance in which the feature of interest is located are produced at a third frame rate, the second rate being different to the third rate.

In a further aspect, the present invention provides an aircraft comprising surveillance apparatus according to the previous aspect.

The surveillance apparatus may further comprise a transmitter operatively coupled to the one or more sensors and configured to transmit, for use by an entity remote from the aircraft, the images produced at the later time-step.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the previous aspect.

BRIEF DESCRIPTION OF THE DRAWINGS

FIG. 4 is a schematic illustration (not to scale) of an example image.

DETAILED DESCRIPTION

Figure 1:
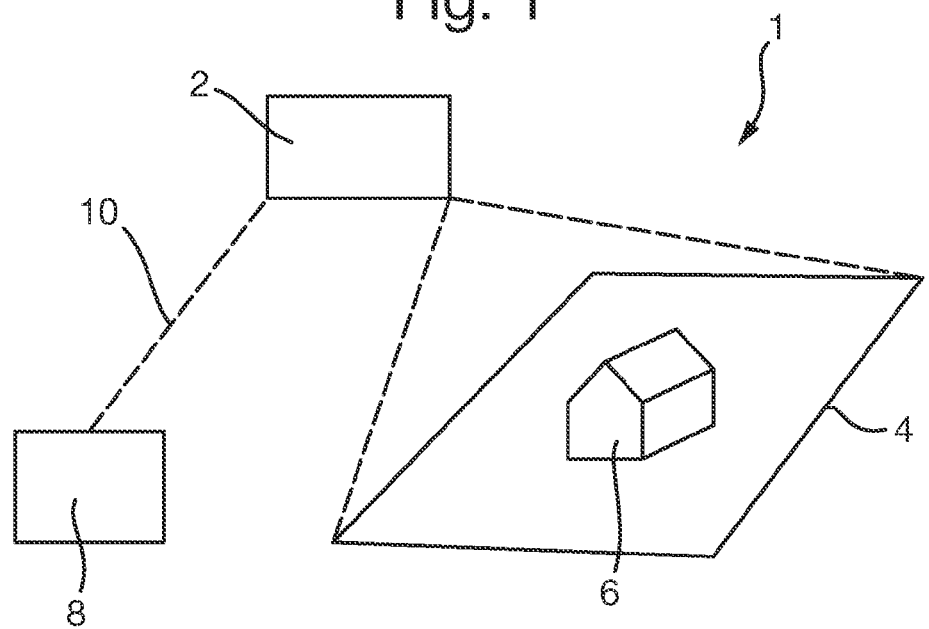
FIG. 1 is a schematic illustration (not to scale) of an example scenario.

FIG. 1 is a schematic illustration (not to scale) of a scenario 1 in which an unmanned air vehicle (UAV) 2 is used to perform an embodiment of a surveillance process. The surveillance process is described in more detail later below with reference to FIG. 3.

In this scenario 1, the UAV 2 flies over (or proximate to) an area of terrain 4. As UAV 2 flies over the area of terrain 4, the UAV 2 performs surveillance of the area of terrain 4 (and the building 6 therein). This surveillance comprises the UAV 2 capturing images of the area of terrain 4 as described in more detail later below with reference to FIG. 4.

In this scenario 1, the area of terrain is outdoors. However, in other scenarios, a different type of area is under surveillance (i.e. the area to be surveilled is an area that is not outdoors). For example, in other embodiments, the area to be surveilled may be within a building.

In this scenario 1, the UAV 2 is connected to a ground station 8 by a wireless data-link 10. This connection is such that information may be sent between the UAV 2 and the ground station 8. The UAV 2 may, for example, be controlled by an operator (e.g. a human operator) located at the ground station 8.

Figure 2:
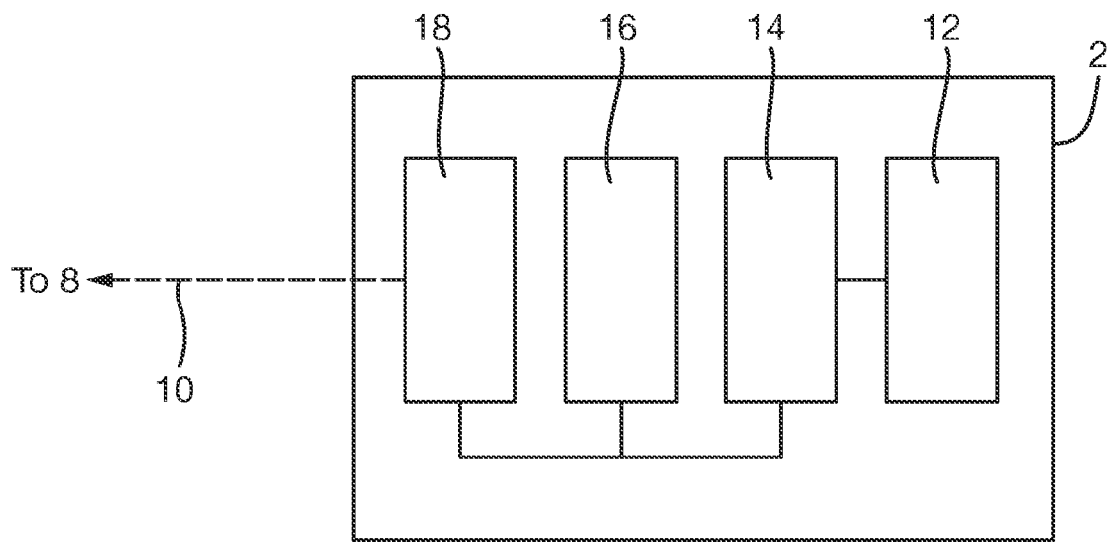
FIG. 2 is a schematic illustration (not to scale) of an unmanned air vehicle.

FIG. 2 is a schematic illustration (not to scale) of the UAV 2.

The UAV 2 comprises a sensor 12, a data acquisition module 14, an automatic change detection (ACD) module 16, and a transceiver 18.

In this embodiment, the sensor 12 is a conventional Complementary Metal Oxide Semiconductor (CMOS) sensor comprising an array of pixel sensors. Each of the respective pixel sensors of the sensor 12 is configured to capture images of a respective different portion of the area of terrain 4 as the UAV 2 flies over, or proximate to, the area of terrain 4. This is such that the whole of the area of terrain 4 (and the building 6) may be imaged using the sensor 12.

The sensor 12 may be mounted on the UAV 2 via a gimbal (not shown in the Figures).

The sensor 12 is connected to the data acquisition module 14 such that information may be sent from the sensor 12 to the data acquisition module 14 and vice versa.

In this embodiment, the data acquisition module 14 is configured to provide, or "drive", a control signal for each of the pixel sensors of the sensor 12. Also, the data acquisition module 14 is configured to provide, or "drive" a clock signal for each of the pixel sensors of the sensor 12. Thus, the data acquisition module 14 controls the operation of the pixel sensors of the sensor 12. For example, the data acquisition module 14 may control the rate at which each pixel sensor of the sensor 12 captures images of the portion of the area of terrain 4 that corresponds to that pixel sensor.

In addition to being connected to the sensor 12, the data acquisition module 14 is connected to the ACD module 16. This is such that information may be sent from the data acquisition module 14 to the ACD module 16 and vice versa. The data acquisition module 14 is also connected to the transceiver 18. This is such that information may be sent from the data acquisition module 14 to the transceiver 18 and vice versa.

In this embodiment, the ACD module 16 is configured to process image data generated by the sensor 12, as described in more detail later below with reference to FIG. 3.

In addition to being connected to the data acquisition module 14, the ACD module 16 is connected to the transceiver 18. This is such that information may be sent from the ACD module 16 to the transceiver 18 and vice versa.

The transceiver 18 is connected to the ground station 8 via the data-link 10 such that information may be sent from the transceiver 18 to the transceiver ground station 8 and vice versa.

Apparatus, including the data acquisition module 14 and ACD module 16, for implementing the above arrangement, and performing the method steps to be described later below with reference to FIG. 3, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media. The apparatus may be wholly on-board the UAV 2, wholly off-board the UAV 2 (e.g. at the ground station 8), or partially on board and partially off-board the UAV 2.

Figure 3:
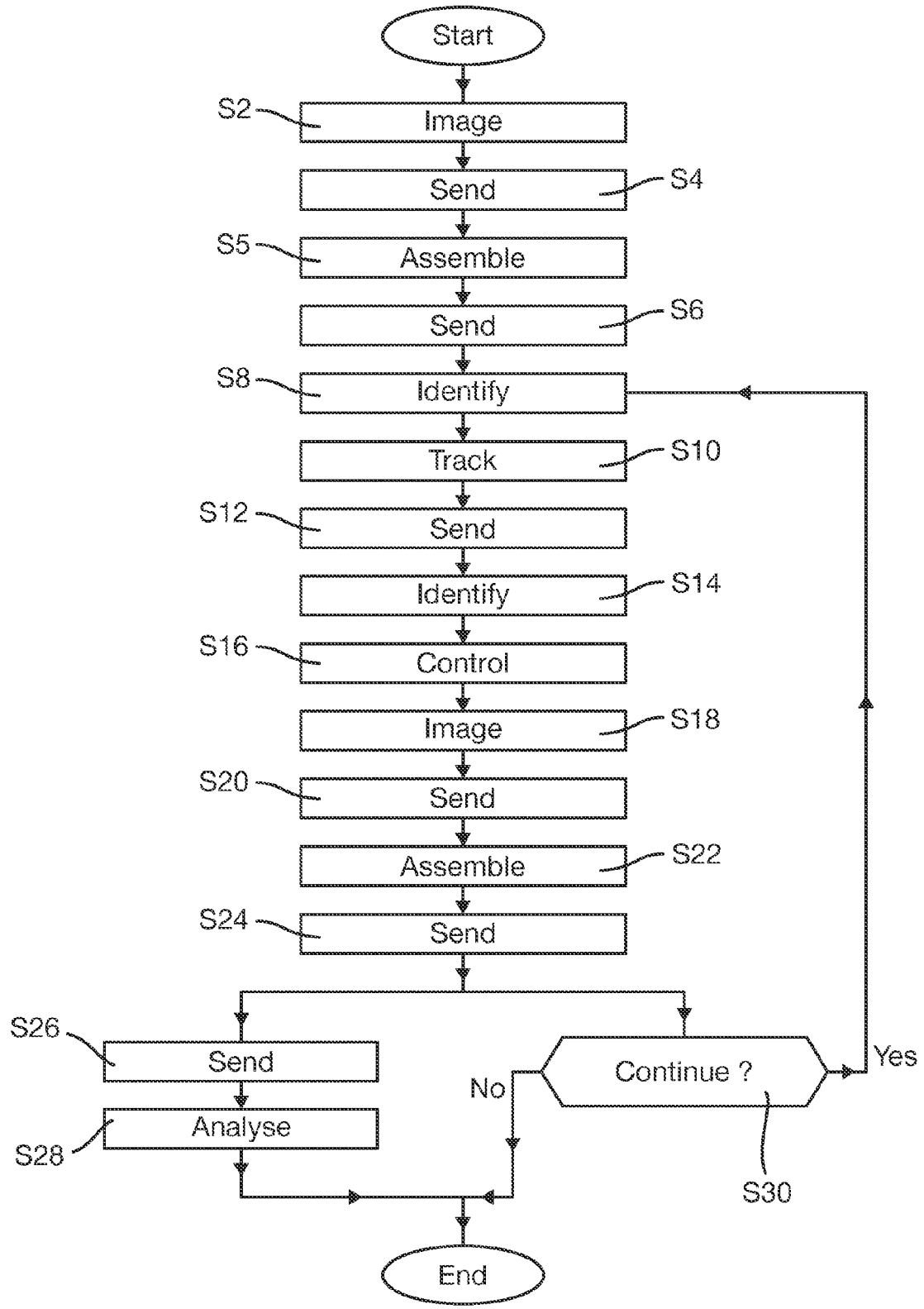
FIG. 3 is a process flow chart showing certain steps of an embodiment of a surveillance process.

FIG. 3 is a process flow chart showing certain steps of an embodiment of a surveillance process performed by the UAV 2 in the above described scenario 1.

At step s2, as the UAV 2 flies proximate to the area of terrain 4, the sensor 12 images the area of terrain 4, i.e. the sensor 12 captures a sequence of images (i.e. frames) of the area of terrain 4 and the building 6 therein. In particular, each pixel sensor of the sensor 12 captures images of a respective portion of the area of terrain 4. This is performed such that all of the area of terrain 4 (and building 6) is imaged.

In this embodiment, at step s2, the images are captured over a series of time-steps (i.e. over a time-period).

In this embodiment, the images captured by the sensor 12 at step s2 are captured at a relatively low frame rate, i.e. a relatively low frequency. In other words, at step s2, the data acquisition module 14 controls the pixel sensors of the sensor 12 to capture images at a relative low rate, i.e. the control signals for the pixel sensor provided to the sensor by the data acquisition module 14 specify a low frame rate for the pixel sensors.

At step s4, the image data captured by the sensor 12 is sent from the sensor 12 to the data acquisition module 14. This may, for example, be performed continuously as the sensor 12 captures images of the area of terrain 4 over a period of time.

At step s5, the data acquisition module 14 assembles images of the area of terrain 4 from the images taken by the pixel sensors of the sensor 12. In this embodiment, a sequence of images of the area of terrain 4 is produced.

At step s6, the assembled images are sent from the data acquisition module 14 to the ACD module 16. This may, for example, be performed continuously as the data acquisition module 14 assembles the images in the image sequence.

At step s8, the ACD module 16 performs a change detection algorithm on the received image data. The change detection algorithm is a conventional change detection algorithm for identifying significant changes between a frame and one or more subsequent frames e.g. between one image from the captured sequence of images and a subsequent image. The change detection algorithm may be used to detect objects (e.g. vehicles, people etc.) moving within the area of terrain 4.

Any appropriate change detection algorithm may be used. For example, a change detection algorithm that detects changes based on changes in image contrast or edge detection may be used. In other embodiments, instead of or in addition to the change detection process, a process for detecting anomalous features or behaviour may be used to detect objects.

In this embodiment, the change detection algorithm comprises defining one or more "regions of interest" in one or more of the captured images. A region of interest is a region within an image in which the detected change occurs (i.e. in which an object is detected). A region of interest may be defined for each of the detected changes/objects.

At step s10, the ACD module 16 performs a conventional tracking algorithm. The tracking algorithm is a conventional tracking algorithm for tracking, between frames, the detected objects or image features.

In this embodiment, the tracking algorithm may be used to determine a position for a detected object at a next time-step (i.e. at the next time at which an image of the area of terrain 4 is to be captured by the sensor 12). The tracking algorithm may also determine a region of interest for the next time step (i.e. a region within an image taken at the next time-step in which the object will most likely be located). Any appropriate tracking algorithm may be used. The size of a region of interest for an object may be dependent upon how certain, or how confident, the tracking algorithm is about the position of that object at the next time step. Also, the size of a region of interest for an object may be dependent upon how quickly that object is moving. For example, the region of interest for an object may be relatively large if that object is a fast moving object compared to if that object was moving more slowly.

FIG. 4 is a schematic illustration (not to scale) of an example frame 20 (i.e. image in the captured sequence of images). The frame 20 is an image that contains the area of terrain 4 and the building 6. The frame 20 further comprises images of objects 22 that are moving within the area of terrain 4. Regions of interest 24 are defined in the frame 20. Each region of interest 24 wholly contains an object 22. Also, the objects 22 have been tracked (as described above with reference to step s10 of the process of FIG. 3) through the sequence of images along respective paths (indicated in FIG. 4 by dotted lines and the reference numeral 26).

At step s12, information that identifies the determined positions, at the next time-step, of each region of interest 24 is sent from the ACD module 16 to the data acquisition module 14. This information may, for example, be coordinates for each of the region of interest 24 (e.g. coordinates of the four corners of a square region of interest) at the time-step.

At step s14, using the received information, the data acquisition module 14 identifies those pixel sensors of the sensor 12 that, at the time-step, would capture an image within a region of interest 24. This may be performed in any appropriate way, for example, the data acquisition module 14 may identify pixel sites (i.e. in effect "addresses") for those pixels that, at the time-step, would capture an image within a region of interest 24.

At step s16, the data acquisition module 14 controls the pixel sensors identified at step s14 (i.e. the pixel sensors that, at the next time-step, are to capture an image with a region of interest 24) such that, at the next time-step, those pixel sensors capture images at a relatively high frame rate (compared to the relatively low frame rate with which images are captured at step s2). In this embodiment, the pixel sensors other than those identified at step s14, i.e. the pixels sensors that, at the next time-step, are to capture an image that is not in a region of interest 24, are controlled so as to capture images at the relatively low frame rate.

At step s18, at the next time-step, the sensor 12 images the area of terrain 4. The pixel sensors of the sensor 12 that capture an image with a region of interest 24 capture images at a relatively high frequency (i.e. at a relatively high rate), whilst the pixel sensors that generate image pixels not within a region of interest 24 capture images with a relatively low frequency.

At step s20, the image data captured by the sensor 12 at step s18 is sent from the sensor 12 to the data acquisition module 14.

At step s22, the data acquisition module 14 assembles images from the received image data. Images of the whole of the area of terrain may be produced. Also, a sequence of images of each of the regions of interest 24 may be produced.

At step s24, the assembled images are sent from the data acquisition module 14 to both the transceiver 18 and the ACD module 16.

In other embodiments, the assembled images may be stored e.g. by the data acquisition module 14, in a database. This database may be onboard the UAV 2. The images stored on such a database may be retrieved (e.g. at a later time) from that database e.g. for use by the ACD module 16, or for sending to the ground station 8 by the transceiver 18.

After step s24, the method proceeds to steps s26 and s30. Step s30 will be described in more detail later below after the description of steps s26 and s28.

At step s26, the images received by the transceiver 18 are sent from the UAV 2 to the ground station 8 via the data-link 10.

At step s28, the images received by the ground station are analysed. This may, for example, be performed by displaying the received imagery to a human operator located at the ground station, and that human operator manually analysing the displayed images. The images may be displayed to the human operator as video footage of the area of terrain 4. The human operator may manipulate the video footage, or any of the individual images, in any appropriate way (e.g. by zooming, pausing, replaying, fast-forwarding, rewinding etc.).

Advantageously, the objects, features and events that are typically deemed to be of interest during surveillance operations, e.g. objects 22 moving within the area of terrain 4, are provided to the ground station 8 (for analysis) at a higher rate than things not typically of interest. Thus, the regions of interest 24 (that include the objects 22 moving through the area of terrain 4) may be displayed to a human operator at the ground station 8 at a relatively high rate. This tends to reduce motion blur and flicker in the portions of the video footage deemed to be of interest. This tends to make analysis of events of interest easier. Also, this tends to increase information content about target motion and tends to increase the chance of capturing information about the target. Also, this tends to make it easier for a human operator to see and track fast moving objects. Furthermore, as regions that are deemed not to be of interest are provided to the ground station at relatively lower rate, the communication bandwidth required for sending images between the UAV 2 and the ground station 8 tends to be reduced compared to if whole images were sent at the relatively higher rate.

At step s30, the ACD module 16 may determine whether or not the surveillance of the area of terrain 4 is to continue, i.e. whether or not the surveillance operation being performed is to be stopped. The ACD module 16 may determine that the surveillance operation is to be stopped in any appropriate way, for example, the ground station 8 may instruct the UAV 2 to stop the surveillance operation.

If, at step s30, it is determined that the surveillance of the area of terrain 4 is to continue, the process of FIG. 3 proceeds back to step s8. Thus, the ACD module performs the change detection and tracking processes using the images assembled by the data acquisition module 14 at step s22. The detected objects 22 may continue to be tracked, and images of regions of interest 24 surrounding those tracked objects 22 may continue to be captured by the sensor 12 at a relatively high rate.

However, if, at step s30, it is determined that the surveillance of the area of terrain 4 is not to continue, the process of FIG. 3 ends.

Thus, a surveillance process performed by the UAV 2 is provided.

An advantage provided by the above described system and method is that of a reduction in communication bandwidth requirements compared with that of a conventional system. Furthermore, if images are stored e.g. on the UAV, memory/storage requirements tend also to be reduced compared to conventional systems. This reduction in communication bandwidth (and/or memory) tends to be facilitated by transmitting (and/or storing) portions of images that do not contain objects of interest as low rate data, whilst only sub-images (i.e. not the whole image) that contain objects of interest are transmitted (and/or stored) as high rate data. The communication bandwidth and/or memory/storage requirements may be further reduced by only transmitting and/or storing (as relatively high rate data) the sub-images that contain objects of interest and discarding the portions of the image that do not contain those objects of interest (i.e. by not sending/storing the images captured at the relatively low rate).

Only sending sub-images that contain objects of interest at a high rate (as opposed to sending the whole of images at high rate) tends to reduce the amount of processing power required. This, in turn, tends to reduce the amount of power, cooling, and storage required for the processing modules. Thus, the weight and cost of the UAV tend to be reduced. Furthermore, for a given amount of processing power, in the above described system, a larger sensor may be used than in a system that transmits whole images at a relatively high rate.

This tracking algorithm used by the ACD module to track a detected object may be performed using the high rate images of only the regions of interest, as opposed to high rate full frame images. This advantageously tends to provide that the data acquisition system used may be simpler and cheaper than a data acquisition system used to perform conventional surveillance methods. This is because the data acquisition system used in the above described method tends only to be required to read out the region of interest mages at the high rate as opposed to full frame data.

In the above described methods, events that are typically deemed to be important in surveillance operations (e.g. objects moving through the area being kept under surveillance) are automatically detected and tracked.

The above described system and method may advantageously be implemented in different surveillance operations (i.e. surveillance operations different to that described above). For example, the above described method may be used to detect, track, and provide high rate video footage of regions of interest when performing road traffic surveillance, crowd control, crowd monitoring, shipping surveillance, air-traffic control, border control, etc.

A further advantage provided by the above described system is that the system is modular. This tends to provide that, if desired, any of the modules (e.g. the sensors, the data acquisition module, or the ACD module) can be updated, repaired, replaced, or changed independently of the other modules of the system. Moreover, the modularity of the system tends to provide that additional sensors can easily be incorporated into the system as required (e.g. depending on the application or any constraints on the system such as spatial constraints imposed by the aircraft). Furthermore, due to its modularity the system is advantageously scalable so that it can be implemented on a variety of platforms.

A further advantage provided by the above described system and method is that, by using the array of cameras (as opposed to, for example, a camera mounted on turret) is that video of more than one object of interest can be extracted simultaneously from within the field of view of a single camera. Furthermore, the extracted video of objects of interest from all the cameras in the array may be coupled together such that a capability of 'videoing' multiple objects of interest at the same time tends to be advantageously provided.

It should be noted that certain of the process steps depicted in the flowchart of FIG. 3 and described above may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the surveillance process is implemented in the scenario described above with reference to FIG. 1. However in other embodiments, the surveillance process may be implemented in a different scenario, e.g. a scenario comprising a plurality of ground stations, a plurality of UAVs and a plurality of targets to be kept under surveillance.

In the above embodiments, the surveillance process was implemented using a UAV. However, in other embodiments, the surveillance process may be performed by one or more different entities, e.g. manned aircraft, land-based or water-based vehicles, surveillance systems on or in buildings, etc.

In the above embodiments, image data is transmitted from the UAV to the ground station (for analysis). However, in other embodiments, some or all of the image data may not be transmitted from the UAV. For example, some or all of the image data may be stored on board the UAV until the surveillance operation is finished. Also for example, only high rate image data (i.e. video footage of the regions of interest) may be transmitted or stored by the UAV.

In the above embodiments, the sensor is a conventional Complementary Metal Oxide Semiconductor (CMOS) sensor comprising an array of pixel sensors. Such a sensor may detect visible light. However, in other embodiments, a different type of sensor or sensor array may be used. For example, in other embodiments, sensors the detect infrared or ultraviolet light may be used instead of or in addition to a visible light detecting sensor (e.g. the CMOS sensor).

In the above embodiments, the change detection and tracking algorithms are performed on-board the UAV by the ACD module. However, in other embodiments, the functionality provided by the ACD module may be provided by a different entity. For example, in other embodiments, a human operator may manually detect changes in the low rate images and define regions of interest within those images that are to be readout at a higher rate. These regions of interest may be tracked automatically (e.g. by the ACD module) or manually (e.g. by the human operator). Such a human operator may be located on-board the aircraft or off-board the aircraft (e.g. at the ground station). In other embodiments, a human operator (or other entity) may review and/or edit the objects and regions of interest generated and tracked by the ACD module.

In the above embodiments, the regions of interest determined and tracked by the ACD module (at steps s8 and s10 of the process of FIG. 3) are imaged differently to region not of interest (i.e. other regions). In particular, those regions of interest are imaged at a higher rate. However, in other embodiments, those regions of interest may be imaged in a different way to that described above. For example, in other embodiments, the determined and tracked regions of interest may be imaged at a relatively higher resolution than regions not of interest. Relatively lower resolution images of regions that are not of interest may, for example, be gathered by grouping together (or binning) multiple pixel sensors that are to image those regions, and imaging the area of terrain using those groups (whilst relatively higher resolution images of the regions of interest may, for example, be gathered by not grouping together the pixel sensors that are to image the regions of interest, and imaging the regions of interest as described in the above embodiments). In other embodiments, the determined and tracked regions of interest may be imaged at both a relatively higher resolution and a relatively higher rate than regions not of interest.

The invention claimed is:

1. A surveillance process comprising:
    capturing, using a first plurality of pixel sensors in a sensor array, a first plurality of images of an area under surveillance at a first frame rate;
    detecting, by at least one processor, a feature of interest within the area under surveillance within at least one of the first plurality of images captured at the first frame rate;
    determining, by the at least one processor, a region of interest corresponding to the detected feature of interest, the region of interest being at least one of:
        a region within the area under surveillance in which the feature of interest will be located at a later time-step; and
        a region within at least one of the first plurality of images of the area under surveillance corresponding to a region within the area under surveillance in which the feature of interest will be located at the later time-step; and
    at the later time-step and using the determined region of interest, capturing, using a second plurality of pixel sensors in the sensor array, a second plurality of images of a portion of the area under surveillance including the determined region of interest at a second frame rate, the second frame rate being different than the first frame rate.

2. A surveillance process according to claim 1, further comprising performing a tracking process to track at least one of the detected feature of interest and the determined region of interest over a period of time.

3. A surveillance process according to claim 2, wherein the tracking process is performed automatically by the at least one processor according to a tracking algorithm, and wherein the size of the region of interest is dependent upon how confident the tracking algorithm is about the position of the feature of interest at the next time step.

4. A surveillance process according to claim 1, wherein detecting the feature of interest comprises performing a change detection algorithm to detect a change between one of the first plurality of images captured at the first frame rate and another one of the first plurality of images subsequently captured at the first frame rate.

5. A surveillance process according to claim 1, wherein:
    the first and second pluralities of pixel sensors comprise the sensor array; and
    a rate at which each pixel sensor in the sensor array captures images may be changed independently from that of each of the other pixel sensors.

6. A surveillance process according to claim 5, wherein the sensor array includes a Complementary Metal Oxide Semiconductor sensor.

7. A surveillance process according to claim 1, further comprising contemporaneously capturing, using a third plurality of pixel sensors in the sensor array, a third plurality of images of a different portion of the area under surveillance not including the determined region of interest at a third frame rate, the third frame rate being different than the second frame rate.

8. A surveillance process according to claim 7, wherein the second frame rate is a higher frame rate than the third frame rate.

9. A surveillance process according claim 7, wherein, at the later time-step, the second plurality of images captured at the second frame rate have a first resolution, and wherein the third plurality of images captured at the third frame rate have a second resolution that is different than the first resolution.

10. A surveillance process according to claim 9, wherein the first resolution is higher than the second resolution.

11. Surveillance apparatus comprising:
    a first plurality of pixel sensors in a sensor array configured to capture a first plurality of images of an area under surveillance at a first frame rate;
    at least one computer processor operatively coupled to the sensor array and configured to:
        detect a feature of interest within the area under surveillance within at least one of the first plurality of images captured at the first frame rate; and
        determine a region of interest corresponding to the detected feature of interest, the region of interest being at least one of:
            a region within the area under surveillance in which the feature of interest will be located at a later time-step; and
            a region within at least one of the first plurality of images of the area under surveillance corresponding to a region within the area under surveillance in which the feature of interest will be located at the later time-step; and
    a second plurality of pixel sensors in the sensor array configured to, at the later time-step, capture a second plurality of images of a portion of the area under surveillance including the determined region of interest at a second frame rate, the second frame rate being different than the first frame rate.

12. An aircraft comprising surveillance apparatus according to claim 11.

13. An aircraft according to claim 12, wherein the surveillance apparatus further comprises a transmitter operatively coupled to the first and second pluralities of pixel sensors and configured to transmit, for use by an entity remote from the aircraft, at least one of the second plurality of images produced at the later time-step.

14. A surveillance apparatus according to claim 11, wherein the feature of interest is detected by performing a change detection algorithm to detect a change between one of the first plurality of images captured at the first frame rate and another one of the first plurality of images subsequently captured at the first frame rate.

15. A surveillance apparatus according to claim 11, wherein, at the later time-step, the second plurality of images captured at the second frame rate have a first resolution, and wherein the first plurality of images captured at the first frame rate have a second resolution that is different than the first resolution, and wherein at least one of:
    the second frame rate is a higher frame rate than the first frame rate; and
    the first resolution is higher than the second resolution.

16. A surveillance apparatus according to claim 11, wherein:
    the first and second pluralities of pixel sensors comprise the sensor array; and
    a rate at which each pixel sensor in the sensor array captures images may be changed independently from that of each of the other pixel sensors.

17. A non-transitory machine readable storage medium storing a program or plurality of programs arranged such that when executed by at least one processor cause the at least one processor to perform a surveillance process comprising:

capturing, using a first plurality of pixel sensors in a sensor array, a first plurality of images of an area under surveillance at a first frame rate;

detecting a feature of interest within the area under surveillance within at least one of the first plurality of images captured at the first frame rate;

determining a region of interest corresponding to the detected feature of interest, the region of interest being at least one of:

a region within the area under surveillance in which the feature of interest will be located at a later time-step; and a region within at least one of the first plurality of images of the area under surveillance corresponding to a region within the area under surveillance in which the feature of interest will be located at the later time-step; and at the later time-step and using the determined region of interest, capturing, using a second plurality of pixel sensors in the sensor array, a second plurality of images of a portion of the area under surveillance including the determined region of interest at a second frame rate, the second frame rate being different than the first frame rate.

18. A non-transitory machine readable storage medium according to claim 17, wherein detecting the feature of interest includes performing a change detection algorithm to detect a change between one of the first plurality of images captured at the first frame rate and another one of the first plurality of images subsequently captured at the first frame rate.

19. A non-transitory machine readable storage medium according to claim 17, wherein, at the later time-step, the second plurality of images captured at the second frame rate have a first resolution, and wherein the first plurality of images captured at the first frame rate have a second resolution that is different than the first resolution.

20. A non-transitory machine readable storage medium according to claim 17, wherein:

the plurality of pixel sensors comprises a sensor array; and a rate at which each pixel sensor in the sensor array captures images may be changed independently from that of each of the other pixel sensors.

\* \* \* \* \*